United States Patent
Hashimoto et al.

(10) Patent No.: US 12,506,322 B2
(45) Date of Patent: Dec. 23, 2025

(54) SURFACE LIGHT-EMISSION TYPE SEMICONDUCTOR LIGHT-EMITTING DEVICE

(71) Applicant: KABUSHIKI KAISHA TOSHIBA, Tokyo (JP)

(72) Inventors: Rei Hashimoto, Edogawa (JP); Tsutomu Kakuno, Fujisawa (JP); Kei Kaneko, Yokohama (JP); Shinji Saito, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 875 days.

(21) Appl. No.: 17/464,765

(22) Filed: Sep. 2, 2021

(65) Prior Publication Data

US 2022/0271508 A1  Aug. 25, 2022

(30) Foreign Application Priority Data

Feb. 22, 2021  (JP) .................................. 2021-026081

(51) Int. Cl.
*H01S 5/11* (2021.01)
*H01S 5/042* (2006.01)
(Continued)

(52) U.S. Cl.
CPC ............ *H01S 5/11* (2021.01); *H01S 5/04254* (2019.08); *H01S 5/187* (2013.01); *H01S 5/3402* (2013.01);
(Continued)

(58) Field of Classification Search
CPC . H01S 5/185–187; H01S 5/0425–0428; H01S 5/11; H01S 5/18344–18352
See application file for complete search history.

(56) References Cited

U.S. PATENT DOCUMENTS 5,568,504 A * 10/1996 Kock .................... H01S 5/187
    372/24
6,167,072 A    12/2000 Zory, Jr.
(Continued)

FOREIGN PATENT DOCUMENTS

CN    107196188 A    9/2017
CN    109802300 A    5/2019
(Continued)

OTHER PUBLICATIONS

Japanese Office Action issued Aug. 1, 2024 in Japanese Patent Application No. 2021-026081 (with unedited computer-generated English Translation), 11 pages.
(Continued)

*Primary Examiner* — Sean P Hagan
(74) *Attorney, Agent, or Firm* — Oblon, McClelland, Maier & Neustadt, L.L.P.

(57) ABSTRACT

A surface light-emission type semiconductor light-emitting device includes a first semiconductor layer; a light-emitting layer provided on the first semiconductor layer; a second semiconductor layer provided on the light-emitting layer; an uneven structure provided on the second semiconductor layer, the uneven structure including a protrusion and a recess next to the protrusion; a first metal layer covering the uneven structure; and a second metal layer provided between the uneven structure and the first metal layer. The second metal layer is provided on one of a bottom surface of the recess, an upper surface of the protrusion, or a side surface of the protrusion. The second metal layer has a reflectance for light radiated from the light-emitting layer, which is less than a reflectance of the first metal layer for the light.

19 Claims, 9 Drawing Sheets

(51) Int. Cl.
*H01S 5/187* (2006.01)
*H01S 5/34* (2006.01)
*H01S 5/343* (2006.01)

(52) U.S. Cl.
CPC ...... *H01S 5/34306* (2013.01); *H01S 5/34313* (2013.01); *H01S 5/04252* (2019.08); *H01S 2301/176* (2013.01)

(56) References Cited

U.S. PATENT DOCUMENTS

| | | | | |
|---|---|---|---|---|
| 6,501,783 | B1* | 12/2002 | Capasso | H01S 5/3402 372/102 |
| 2005/0067625 | A1* | 3/2005 | Hata | G02B 6/1226 257/E33.068 |
| 2005/0226281 | A1 | 10/2005 | Faraone et al. | |
| 2006/0291514 | A1* | 12/2006 | Behfar | H01S 5/028 438/33 |
| 2007/0201526 | A1* | 8/2007 | Hori | H01S 5/18308 372/98 |
| 2008/0259981 | A1* | 10/2008 | Wang | G02F 1/017 372/44.01 |
| 2008/0279233 | A1* | 11/2008 | Carras | H01S 5/1228 372/45.01 |
| 2012/0056222 | A1* | 3/2012 | Kitagawa | B82Y 20/00 257/E33.068 |
| 2013/0016749 | A1* | 1/2013 | Motoda | H01S 5/1032 372/45.01 |
| 2015/0349195 | A1* | 12/2015 | Yu | H01L 33/382 438/47 |
| 2019/0074663 | A1 | 3/2019 | Saito et al. | |
| 2020/0274331 | A1 | 8/2020 | Kaneko et al. | |

FOREIGN PATENT DOCUMENTS

| | | |
|---|---|---|
| EP | 2 187 456 A2 | 5/2010 |
| JP | 2000-277802 A | 10/2000 |
| JP | 2006-135311 A | 5/2006 |
| JP | 2007-103690 | 4/2007 |
| JP | 2009-231773 A | 10/2009 |
| JP | 2019-47023 A | 3/2019 |
| JP | 2019-197933 A | 11/2019 |
| JP | 2020-68330 A | 4/2020 |

OTHER PUBLICATIONS

Office Action mailed Mar. 29, 2025, in Chinese Application No. 202111042859.5 filed Sep. 7, 2021 (w/English machine translation).

* cited by examiner

SURFACE LIGHT-EMISSION TYPE SEMICONDUCTOR LIGHT-EMITTING DEVICE

CROSS-REFERENCE TO RELATED APPLICATIONS

This application is based upon and claims the benefit of priority from Japanese Patent Application No. 2021-026081, filed on Feb. 22, 2021; the entire contents of which are incorporated herein by reference.

FIELD

Embodiments relate to a surface light-emission type semiconductor light-emitting device.

BACKGROUND

The surface light-emission type semiconductor light-emitting device is required to have a large light output.

DETAILED DESCRIPTION

According to an embodiment, a surface light-emission type semiconductor light-emitting device includes a first semiconductor layer; a light-emitting layer provided on the first semiconductor layer; a second semiconductor layer provided on the light-emitting layer; an uneven structure provided on the second semiconductor layer, the uneven structure including a protrusion and a recess next to the protrusion; a first metal layer covering the uneven structure; and a second metal layer provided between the uneven structure and the first metal layer. The second metal layer is provided on one of a bottom surface of the recess, an upper surface of the protrusion, or a side surface of the protrusion. The second metal layer has a reflectance for light radiated from the light-emitting layer, which is less than a reflectance of the first metal layer for the light.

Embodiments will now be described with reference to the drawings. The same portions inside the drawings are marked with the same numerals; a detailed description is omitted as appropriate; and the different portions are described. The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

There are cases where the dispositions of the components are described using the directions of XYZ axes shown in the drawings. The X-axis, the Y-axis, and the Z-axis are orthogonal to each other. Hereinbelow, the directions of the X-axis, the Y-axis, and the Z-axis are described as an X-direction, a Y-direction, and a Z-direction. Also, there are cases where the Z-direction is described as upward and the direction opposite to the Z-direction is described as downward.

Figure 1:
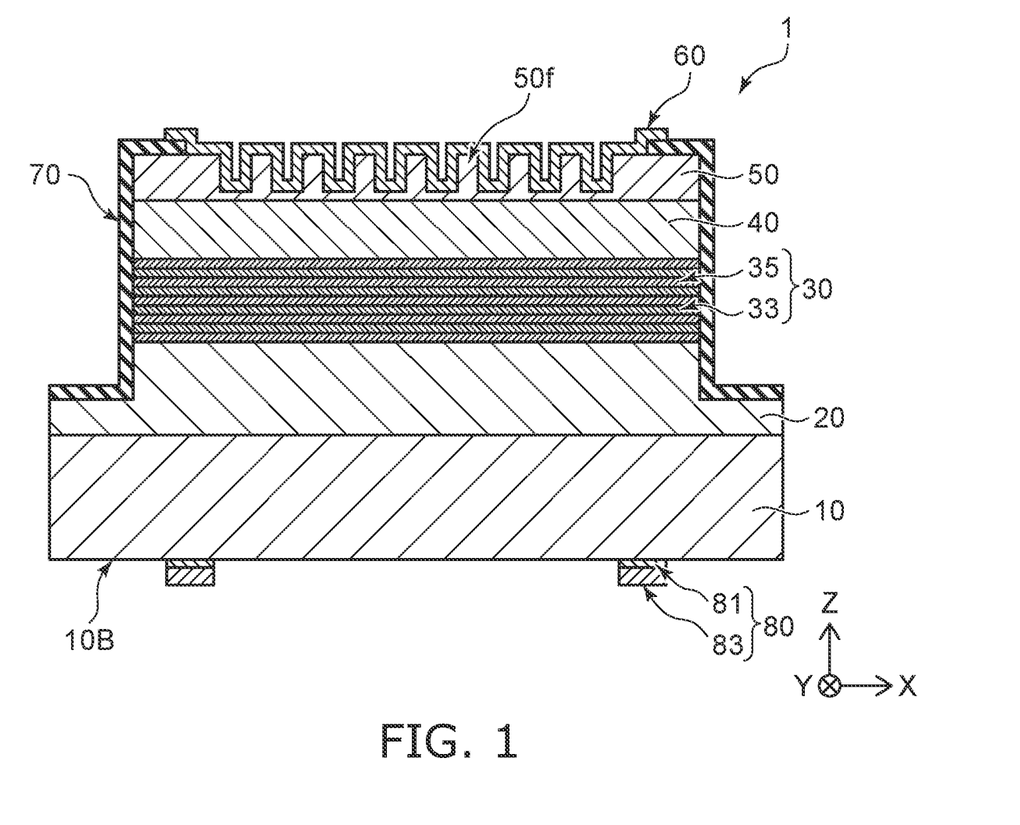
FIG. 1 is a schematic cross-sectional view showing a surface light emission type semiconductor light-emitting device according to an embodiment.

FIG. 1 is a schematic cross-sectional view showing a surface light-emission type semiconductor light-emitting device 1 according to an embodiment. The semiconductor light-emitting device 1 is, for example, a surface light-emitting QCL (Quantum Cascade Laser).

The semiconductor light-emitting device 1 includes a semiconductor substrate 10, a first semiconductor layer 20, a light-emitting layer 30, a second semiconductor layer 40, a third semiconductor layer 50, a front electrode 60, an insulating film 70, and a back electrode 80.

The semiconductor substrate 10 is, for example, an n-type indium phosphide (InP) substrate. The semiconductor substrate 10 may be an n-type GaAs substrate.

The first semiconductor layer 20 is provided on the semiconductor substrate 10. The first semiconductor layer 20 is, for example, an n-type InP layer. A buffer layer may be provided between the semiconductor substrate 10 and the first semiconductor layer 20.

The light-emitting layer 30 is provided on the first semiconductor layer 20. For example, the light-emitting layer 30 includes a quantum well structure that generates intersubband transitions of carriers. The light-emitting layer 30 includes, for example, an n-type Group III-V compound semiconductor doped with silicon, and emits light due to subband transitions of electrons.

The light-emitting layer 30 includes, for example, a quantum well structure in which a quantum well layer 33 and a barrier layer 35 are alternately stacked in a direction, e.g., a Z-direction, that is orthogonal to the upper surface of the first semiconductor layer 20. The quantum well layer 33 includes, for example, a first compound semiconductor (InGaAs); and the barrier layer 35 includes, for example, a second compound semiconductor (AlInAs).

Here, InGaAs is a compound semiconductor of the compositional formula $In_xGa_{1-x}As$ ($0<x<1$). AlInAs is another compound semiconductor of the compositional formula $Al_yIn_{1-y}As$ ($0<y<1$).

The light-emitting layer 30 includes, for example, a light-emitting multi-quantum well region that includes the first and second compound semiconductors, and an injection multi-quantum well region that includes other first and second compound semiconductors. The light-emitting layer 30 includes multiple pairs of the light-emitting multi-quantum well region and the injection multi-quantum well region that are stacked alternately.

The second semiconductor layer 40 is provided on the light-emitting layer 30. The second semiconductor layer 40 is, for example, an n-type InP layer.

The third semiconductor layer 50 is provided on the second semiconductor layer 40. The third semiconductor layer 50 is, for example, an n-type InGaAs layer. A photonic crystal (PC) is provided in the third semiconductor layer 50. The photonic crystal (hereinbelow, the PC 50f) includes an uneven structure that has a constant periodicity. The PC 50f acts as a waveguide which guides the light radiated from the light-emitting layer 30 in a direction perpendicular to the upper surface of the semiconductor substrate 10.

The PC 50f functions as a photonic crystal that selects the wavelength and controls the emission angle of the laser light. The PC 50f is designed so that the light having desired wavelength resonates inside the light-emitting layer 30 and induces laser oscillation. The laser light is emitted in a direction that is substantially perpendicular to the boundary between the light-emitting layer 30 and the first semiconductor layer 20. Here, "substantially perpendicular" means that the angle with respect to the boundary between the light-emitting layer 30 and the first semiconductor layer 20 is not less than 81° and not more than 99°. The PC 50f includes multiple recesses that are, for example, periodically arranged as a two-dimensional diffraction grating. For example, the recesses of the PC 50f are right-triangular in the top-view of the third semiconductor layer 50. The shapes of the recesses and the arrangement of the protrusions are not limited to those of the examples.

The front electrode 60 is provided on the third semiconductor layer 50. The front electrode 60 covers the PC 50f. The front electrode 60 reflects the light radiated from the light-emitting layer 30.

The semiconductor light-emitting device 1 has a mesa structure that includes the first semiconductor layer 20, the light-emitting layer 30, the second semiconductor layer 40, and the third semiconductor layer 50. The insulating film 70 covers the side surface of the mesa structure. The insulating film 70 is, for example, a silicon oxide film. The insulating film 70 also covers the surface of the semiconductor substrate 10 with a portion of the first semiconductor layer 20 interposed.

The back electrode 80 is provided on a back surface 10B of the semiconductor substrate 10. The back electrode 80 includes, for example, a titanium (Ti) layer 81 and a gold (Au) layer 83. The Ti layer 81 is provided between the semiconductor substrate 10 and the Au layer 83.

In the semiconductor light-emitting device 1, a driving current flows between the front electrode 60 and the back electrode 80, and the carriers (the electrons) are injected into the light-emitting layer 30. The light-emitting layer 30 emits QCL light guided by the PC 50f. The QCL light is generated by stimulated emission due to the energy relaxation of the carriers in the quantum well layer 33. The QCL light is radiated externally from the back surface 10B of the semiconductor substrate 10. The wavelength of the QCL light is, for example, 4.5 micrometers (μm).

Figure 2A:
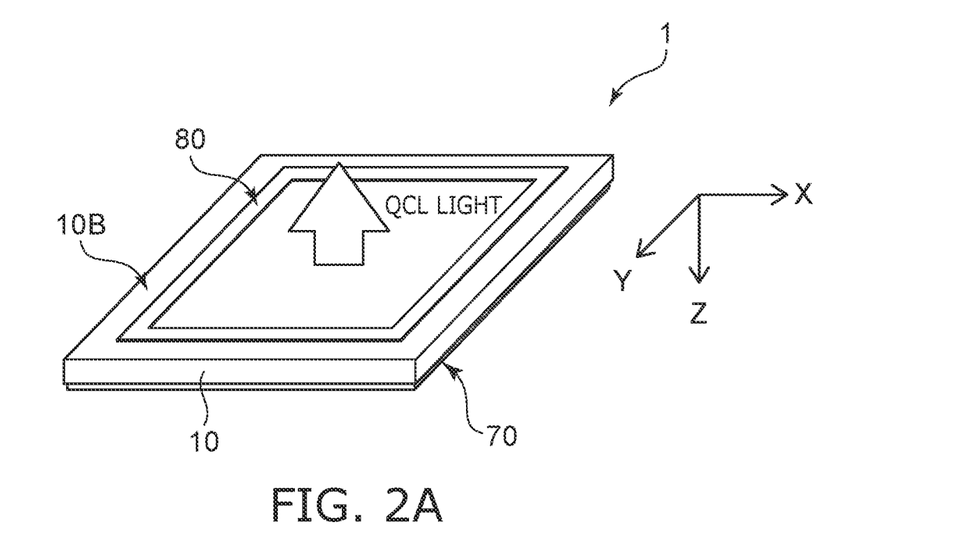
FIGS. 2A and 2B are perspective views schematically showing the surface light emission type semiconductor light-emitting device according to the embodiment.
Figure 2B:
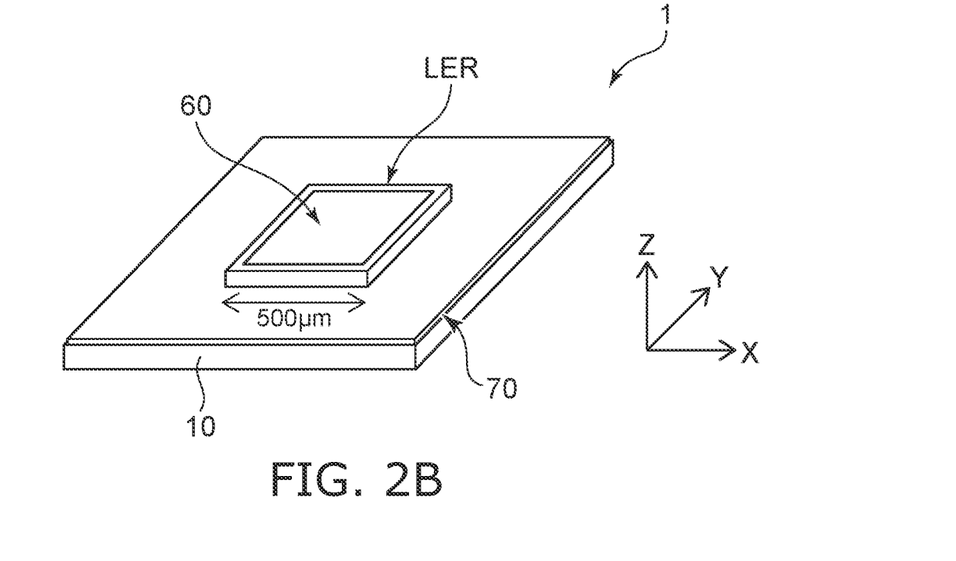

FIGS. 2A and 2B are perspective views schematically showing the semiconductor light-emitting device 1 according to the embodiment. FIG. 2A is a schematic view showing the backside of the semiconductor device 1. FIG. 2B is a schematic view showing the front side of the semiconductor device 1.

As shown in FIG. 2A, the QCL light is radiated from the back surface 10B of the semiconductor substrate 10. The back electrode 80 surrounds the region where the QCL light is radiated.

As shown in FIG. 2B, a mesa-shaped light-emitting region LER is provided at the front side of the semiconductor substrate 10. The insulating film 70 covers the side surface of the light-emitting region LER and the front side of the semiconductor substrate 10.

The light-emitting region LER includes the first semiconductor layer 20, the light-emitting layer 30, the second semiconductor layer 40, and the third semiconductor layer 50. The front electrode 60 covers the PC 50f at the upper surface of the light-emitting region LER. For example, the upper surface of the light-emitting region LER has a square shape of which the length of one side is 500 μm.

Figure 3A:
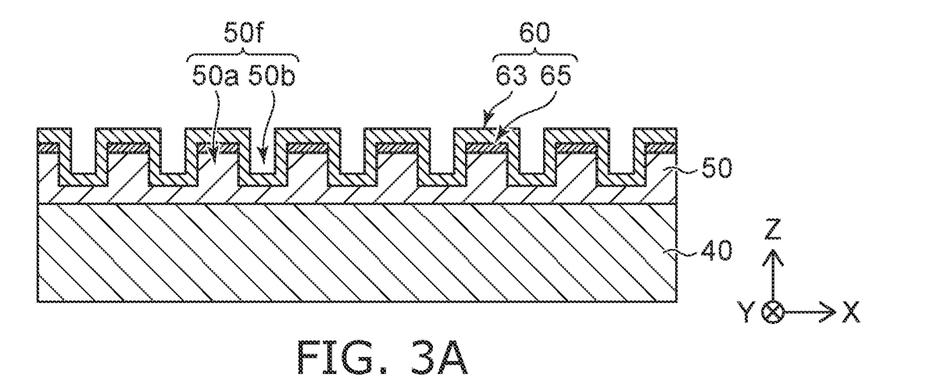
FIGS. 3A to 3C are schematic cross-sectional views illustrating the structures of photonic crystals of the surface light-emission type semiconductor light-emitting device according to the embodiment.
Figure 3B:
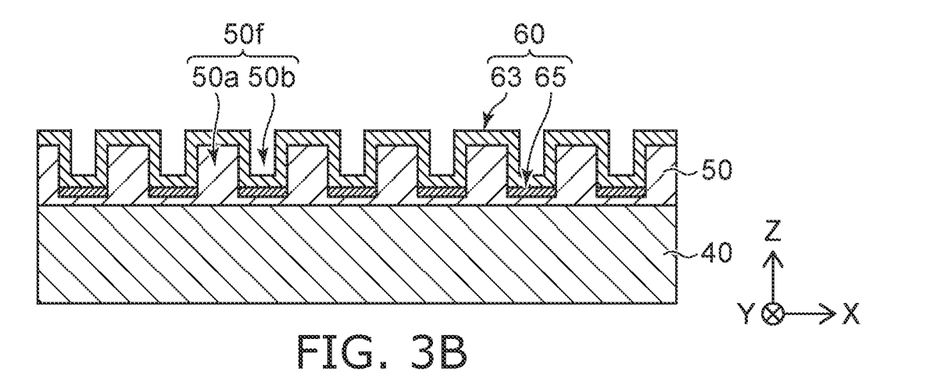
Figure 3C:
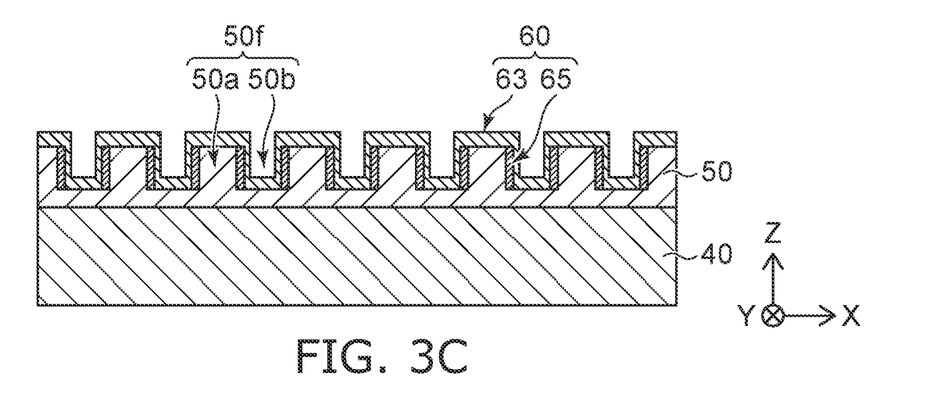

FIGS. 3A to 3C are schematic cross-sectional views illustrating the structures of the PC 50f in the semiconductor light-emitting device 1 according to the embodiment. The PC 50f may have one of the structures shown in FIGS. 3A to 3C.

The PC 50f is provided at the upper side of the third semiconductor layer 50 opposite to the second semiconductor layer 40. The PC 50f includes a protrusion 50a and a recess 50b. Multiple protrusions 50a are provided; and the recess 50b is provided between adjacent protrusions 50a. The multiple protrusions 50a are arranged in a direction, e.g., an X-direction, that is along the upper surface of the second semiconductor layer 40. The protrusions 50a are arranged in the X-direction at a constant period. The protrusions 50a also are arranged at a constant period in a Y-direction (not-illustrated). For example, the period of the protrusions 50a is less than the wavelength of the QCL light in each of the X-direction and the Y-direction.

The front electrode 60 includes a first metal layer 63 and a second metal layer 65 and covers the PC 50f. The first metal layer 63 is, for example, a gold (Au) layer. The second metal layer 65 is, for example, a titanium (Ti) layer. Alternatively, the second metal layer 65 may be a nickel (Ni) layer or a chrome (Cr) layer.

The second metal layer 65 is provided between the third semiconductor layer 50 and the first metal layer 63. The adhesion strength of the second metal layer 65 to the third semiconductor layer 50 is greater than the adhesion strength of the first metal layer 63 to the third semiconductor layer 50. In other words, the adhesion strength of the second metal layer 65 to the uneven structure that includes the protrusion 50a and the recess 50b is greater than the adhesion strength of the first metal layer 63 to the uneven structure.

The adhesion strength of the second metal layer 65 to the uneven structure decreases when the layer thickness of the second metal layer 65 is thin. For example, the adhesion strength of the second metal layer 65 to the uneven structure becomes insufficient when the layer thickness of the Ti layer is not more than 25 nanometers (nm).

On the other hand, the reflectance of the first metal layer 63 for the QCL light radiated by the light-emitting layer 30 is greater than the reflectance of the second metal layer 65 for the QCL light. In other words, the absorptance of the second metal layer 65 for the QCL light is greater than the absorptance of the first metal layer 63 for the QCL light.

For example, when the layer thickness of the Ti layer (the second metal layer 65) is 50 nm, the reflectance for the QCL light of the electrode in which the Ti layer and the Au layer (the first metal layer 63) are stacked is 40% less than the reflectance for the QCL light of an electrode of the Au layer without the Ti layer interposed.

In the example shown in FIG. 3A, the second metal layer 65 is provided at the upper surface of the protrusion 50a but is not provided on the side surface of the protrusion 50a and on the bottom surface of the recess 50b. The layer thickness of the second metal layer 65 is, for example, 50 nm. The first metal layer 63 contacts the side surface of the protrusion 50a and the bottom surface of the recess 50b. The reflectance of the front electrode 60 shown in FIG. 3A is, for example, about 20% greater than a reflectance in the case where the layer thickness of the second metal layer 65 is 50 nm and the second metal layer 65 covers the entire surface of the uneven structure.

In the example shown in FIG. 3B, the second metal layer 65 is provided on the bottom surface of the recess 50b but is not provided on the upper surface and the side surface of the protrusion 50a. The layer thickness of the second metal layer 65 is, for example, 50 nm. The first metal layer 63 contacts the upper surface and the side surface of the protrusion 50a. Also, in the example, the reflectance of the front electrode 60 can be about 20% greater than the reflectance in the case where the second metal layer 65 covers the entire surface of the uneven structure.

In the example shown in FIG. 3C, the second metal layer 65 is provided on the side surface of the protrusion 50a but is not provided on the upper surface of the protrusion 50a and the bottom surface of the recess 50b. The layer thickness of the second metal layer 65 is, for example, 50 nm. The first metal layer 63 contacts the upper surface of the protrusion 50a and the bottom surface of the recess 50b. Also, in the example, the reflectance of the front electrode 60 can be greater than the reflectance in the case where the second metal layer 65 covers the entire surface of the uneven structure.

In the examples shown in FIGS. 3A and 3C, the effective refractive index difference between the recess 50b and the protrusion 50a of the PC 50f can be increased by partially providing the second metal layer 65. The function of the PC 50f can be improved thereby.

Figure 4A:
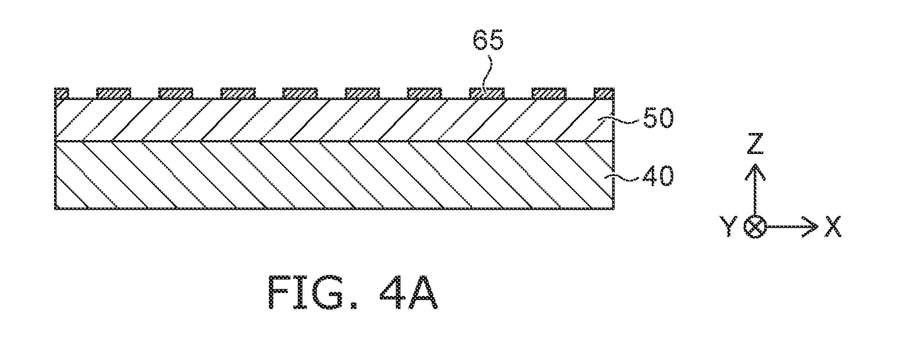
FIGS. 4A and 4B are schematic cross-sectional views showing a method for manufacturing a photonic crystal according to the embodiment.
Figure 4B:
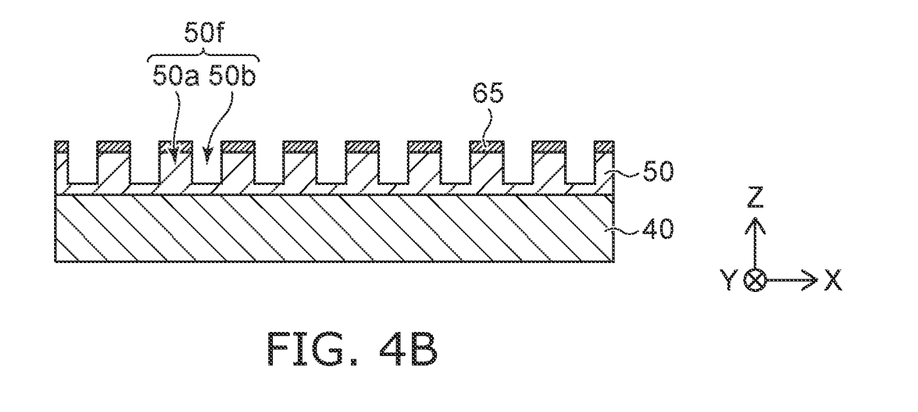

FIGS. 4A and 4B are schematic cross-sectional views showing a method for manufacturing the PC 50f according to the embodiment.

As shown in FIG. 4A, multiple second metal layers 65 are formed on the third semiconductor layer 50. For example, the second metal layers 65 are arranged at a constant periodicity in each of the X-direction and the Y-direction along the upper surface of the third semiconductor layer 50.

As shown in FIG. 4B, the protrusion 50a and the recess 50b are formed by selectively removing the third semiconductor layer 50. The second metal layer 65 can be used as an etching mask. Subsequently, the first metal layer 63 is formed to cover the second metal layers 65 and the inner surfaces of the recesses 50b. As shown in FIG. 3A, the PC 50f and the front electrode 60 can be formed thereby.

Figure 5A:
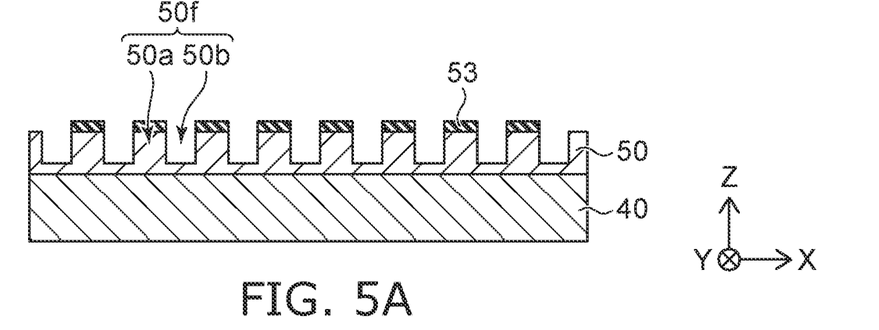
FIGS. 5A to 5C are schematic cross-sectional views showing a method for manufacturing a photonic crystal according to a first modification of the embodiment.
Figure 5B:
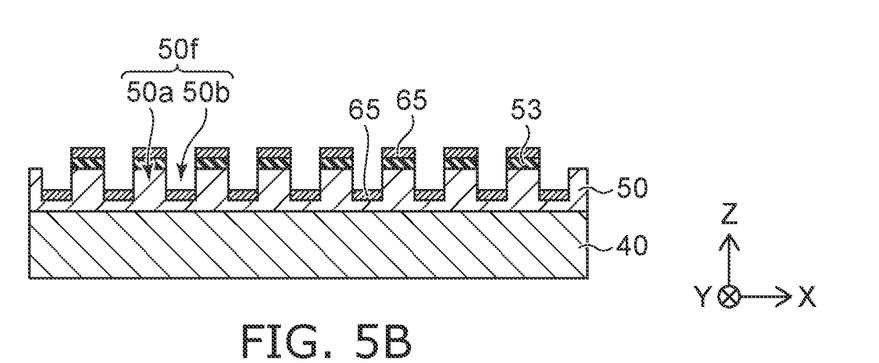
Figure 5C:
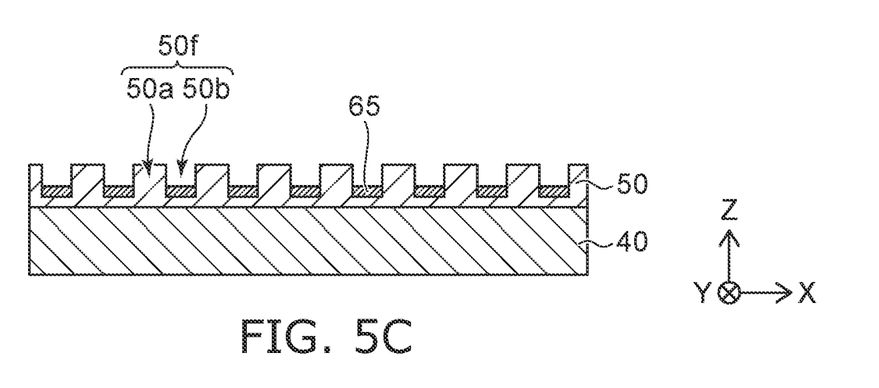

FIGS. 5A to 5C are schematic cross-sectional views showing a method for manufacturing the PC 50f according to a first modification of the embodiment.

As shown in FIG. 5A, the protrusion 50a and the recess 50b are formed by selectively removing the third semiconductor layer 50 after forming an etching mask 53 on the third semiconductor layer 50. The etching mask 53 is, for example, a photoresist.

As shown in FIG. 5B, the second metal layer 65 is formed on the third semiconductor layer 50. The second metal layer 65 is formed using, for example, a deposition method such as vacuum vapor deposition that has high directivity. Thereby, the second metal layer 65 is formed on the etching mask 53 and on the bottom surface of the recess 50b. In this process, the deposition of the second metal layer 65 is suppressed on the side surface of the protrusion 50a.

As shown in FIG. 5C, the second metal layer 65 that is formed on the etching mask 53 is removed together with the etching mask 53. Thereby, the second metal layer 65 remains on the bottom surface of the recess 50b; and the upper surface and the side surface of the protrusion 50a are exposed.

Then, the first metal layer 63 is formed to cover the protrusion 50a and the bottom surface of the recess 50b. The PC 50f and the front electrode 60 can be formed thereby as shown in FIG. 3B.

Figure 6A:
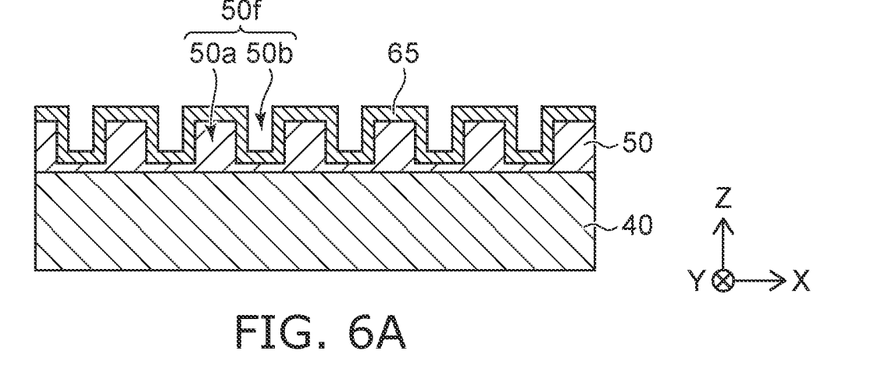
FIGS. 6A and 6B are schematic cross-sectional views showing a method for manufacturing a photonic crystal according to a second modification of the embodiment.
Figure 6B:
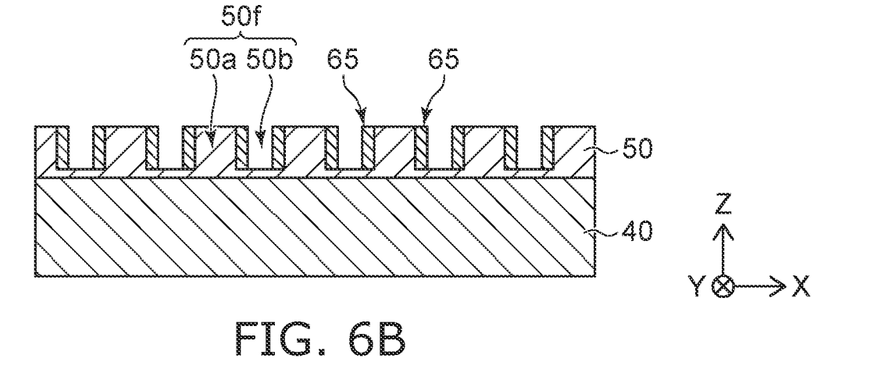

FIGS. 6A and 6B are schematic cross-sectional views showing a method for manufacturing the PC 50f according to a second modification of the embodiment.

As shown in FIG. 6A, the second metal layer 65 is formed to cover the protrusion 50a and the recess 50b. The second metal layer 65 is formed so that the a space remains in the recess 50b.

For example, the protrusion 50a and the recess 50b are formed by selectively removing the third semiconductor layer 50. The third semiconductor layer 50 is removed using the etching mask 53 (referring to FIG. 5A). The second metal layer 65 is formed after removing the etching mask 53. The second metal layer 65 is formed using a deposition method such as sputtering and like that has good step coverage.

As shown in FIG. 6B, the second metal layer 65 is removed so that the portion formed on the side surface of the protrusion 50a remains. The second metal layer 65 is removed using, for example, anisotropic RIE (Reactive Ion Etching). Then, the first metal layer 63 is formed to cover the protrusion 50a and the bottom surface of the recess 50b. As shown in FIG. 3C, the PC 50f and the front electrode 60 can be formed thereby.

FIGS. 7A to 7D are schematic cross-sectional views showing a method for manufacturing the PC 50f according to a third modification of the embodiment.

Figure 7A:
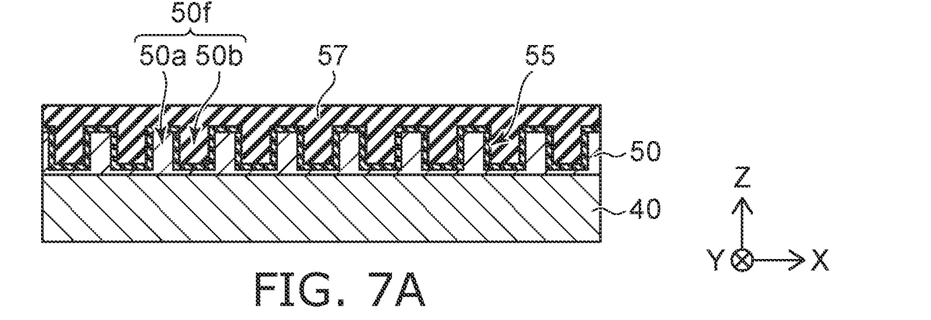
FIGS. 7A to 7D are schematic cross-sectional views showing a method for manufacturing a photonic crystal according to a third modification of the embodiment.

As shown in FIG. 7A, an insulating film 55 is formed to cover the protrusion 50a and the recess 50b. The insulating film 55 is formed so that a space remains in the recess 50b. The insulating film 55 is, for example, a silicon oxide film. Then, a sacrificial film 57 is formed on the insulating film 55. The sacrificial film 57 fills the recess 50b. The sacrificial film 57 is, for example, a silicon nitride film.

Figure 7B:
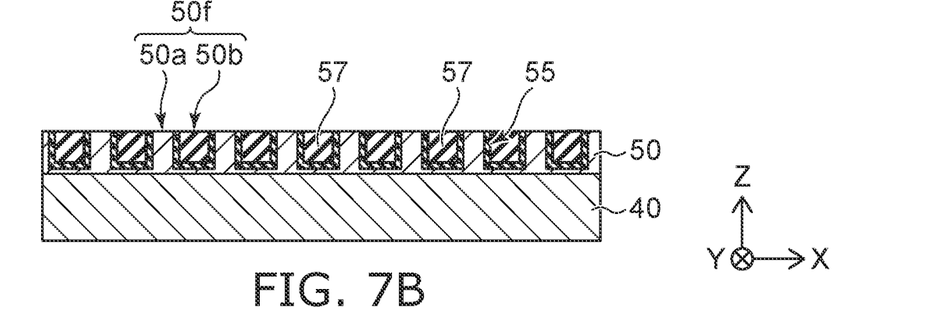

As shown in FIG. 7B, the insulating film 55 and the sacrificial film 57 are removed so that the portion formed in the recess 50b remains; and the upper surface of the protrusion 50a is exposed.

Figure 7C:
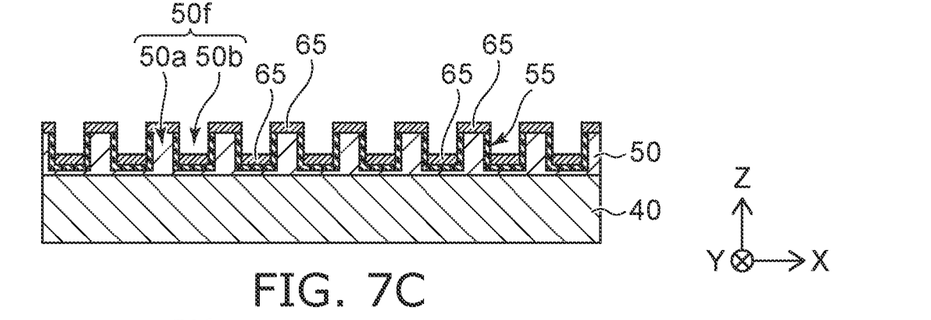

As shown in FIG. 7C, the second metal layer 65 is formed after removing the sacrificial film 57. The second metal layer 65 is formed using, for example, a deposition method such as vacuum vapor deposition that has high directivity. The second metal layer 65 is formed on the upper surface of the protrusion 50a and the bottom surface of the recess 50b. The second metal layer 65 is formed on the bottom surface of the recess 50b with the insulating film 55 interposed.

Figure 7D:
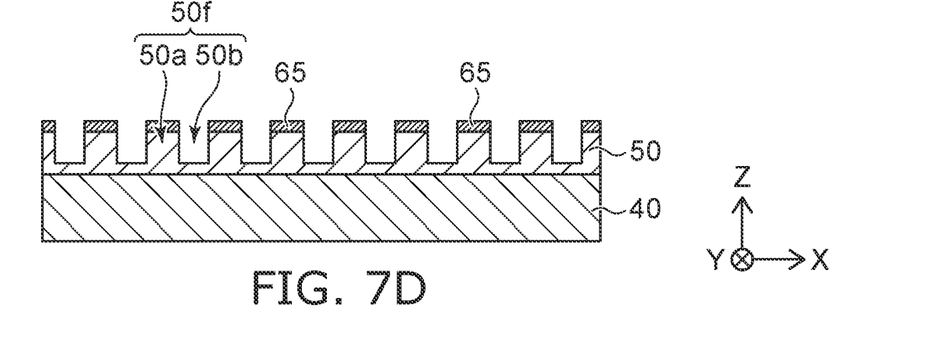

As shown in FIG. 7D, the portion of the second metal layer 65 that is formed on the bottom surface of the recess 50b is removed together with the insulating film 55. The insulating film 55 is removed using, for example, wet etching. Subsequently, the first metal layer 63 is formed to cover the protrusion 50a and the bottom surface of the recess 50b. As shown in FIG. 3A, the PC 50f and the front electrode 60 can be formed thereby.

Figure 8A:
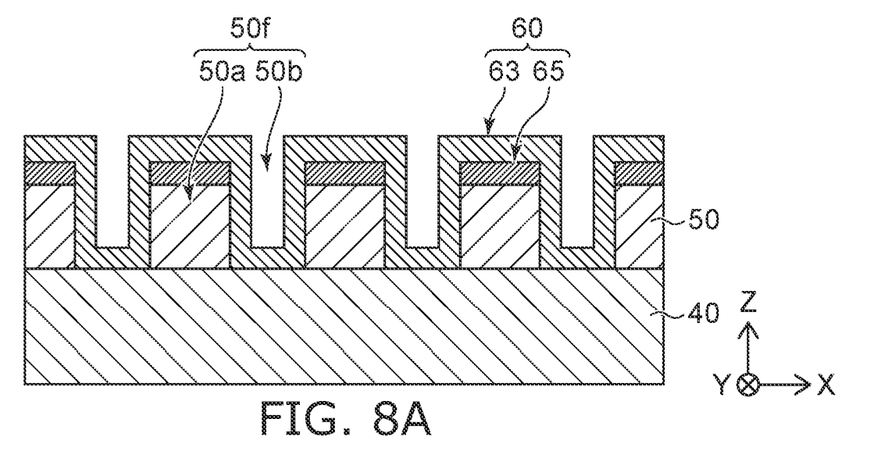
FIGS. 8A to 8C are schematic cross-sectional views showing photonic crystals according to modifications of the embodiment.
Figure 8B:
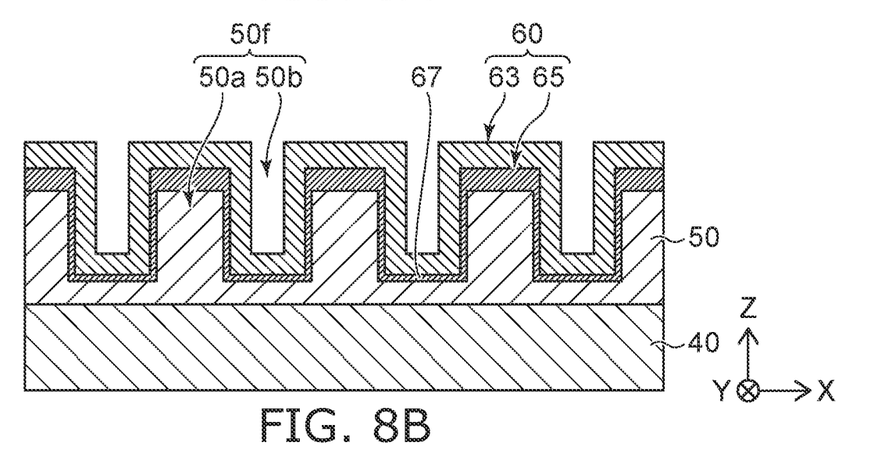
Figure 8C:
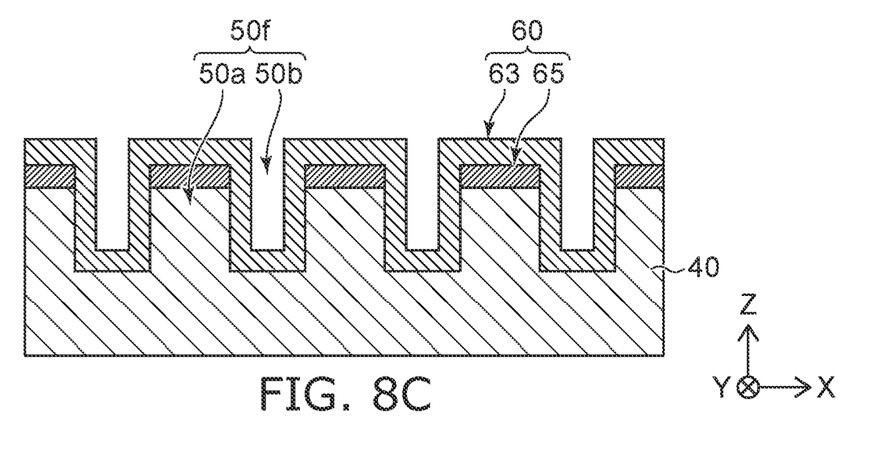

FIGS. 8A to 8C are schematic cross-sectional views showing the PC 50*f* according to modifications of the embodiment.

In the example shown in FIG. 8A, the PC 50*f* is formed by removing the third semiconductor layer 50 so that the second semiconductor layer 40 is exposed at the bottom surface of the recess 50*b*. The second metal layer 65 is provided at the upper surface of the protrusion 50*a*. The first metal layer 63 is provided to cover the protrusion 50*a* and the recess 50*b*. The first metal layer 63 contacts the second semiconductor layer 40 exposed at the bottom surface of the recess 50*b*.

In the example shown in FIG. 8B, the second metal layer 65 is provided at the upper surface of the protrusion 50*a* of the PC 50*f*. A third metal layer 67 is provided on the side surface of the protrusion 50*a* and on the bottom surface of the recess 50*b*. The third metal layer 67 is provided between the first metal layer 63 and the third semiconductor layer 50. The layer thickness of the third metal layer 67 is less than the layer thickness of the second metal layer 65. The third metal layer 67 includes, for example, the same material as the second metal layer 65.

In the example as well, the reflectance of the front electrode 60 can be increased by providing the third metal layer 67 with the layer thickness less than the layer thickness of the second metal layer 65. In the PC 50*f* according to the embodiment, a prescribed adhesion strength between the PC 50*f* and the front electrode 60 can be ensured by providing the second metal layer 65. However, when the first metal layer 63 directly contacts the third semiconductor layer 50, a partial reduction of the adhesion strength cannot be avoided. In the example, the partial reduction of the adhesion strength at the side surface of the protrusion 50*a* and the bottom surface of the recess 50*b* can be mitigated by providing the third metal layer 67 between the first metal layer 63 and the third semiconductor layer 50.

In the example shown in FIG. 8C, the third semiconductor layer 50 is not provided, and the PC 50*f* is provided at the upper surface of the second semiconductor layer 40 at the side opposite to the light-emitting layer 30.

The third metal layer 67 shown in FIG. 8B is applicable to the examples shown in FIGS. 8A and 8C. Although, in the examples of the PC 50*f* shown in FIGS. 8A to 8C, the second metal layer 65 is provided at the upper surface of the protrusion 50*a*, the embodiments are not limited thereto. In other words, the features shown in FIGS. 8A to 8C are applicable even when the second metal layer 65 is provided on the bottom surface of the recess 50*b* or on the side surface of the protrusion 50*a*.

Figure 9A:
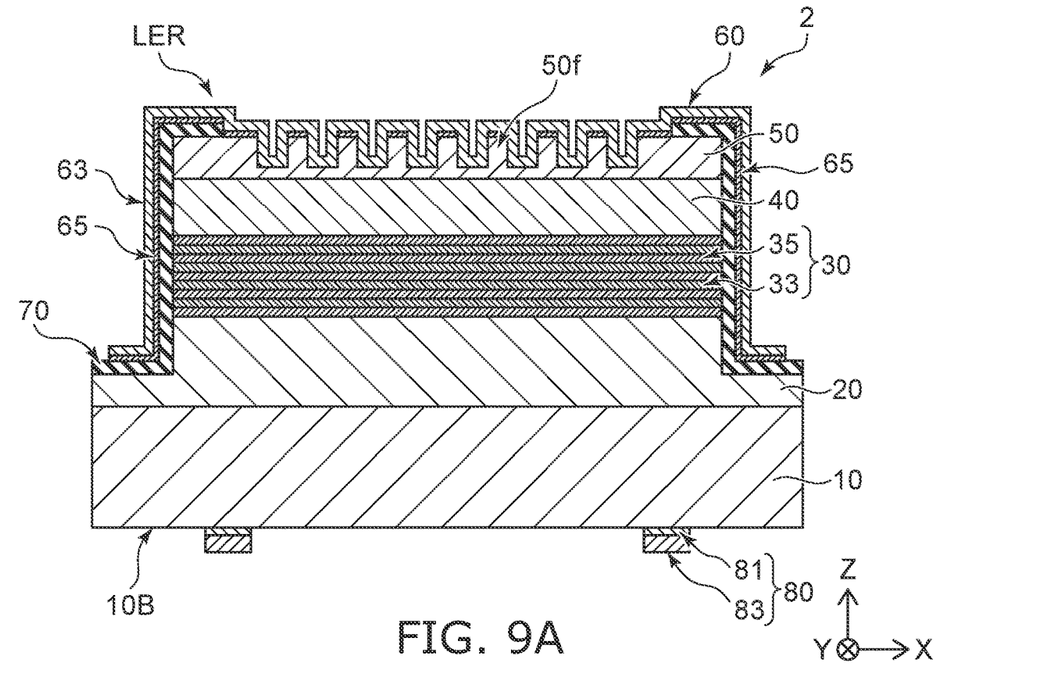
FIGS. 9A and 9B are schematic cross-sectional views showing surface light-emission type semiconductor light-emitting devices according to modifications of the embodiment.
Figure 9B:
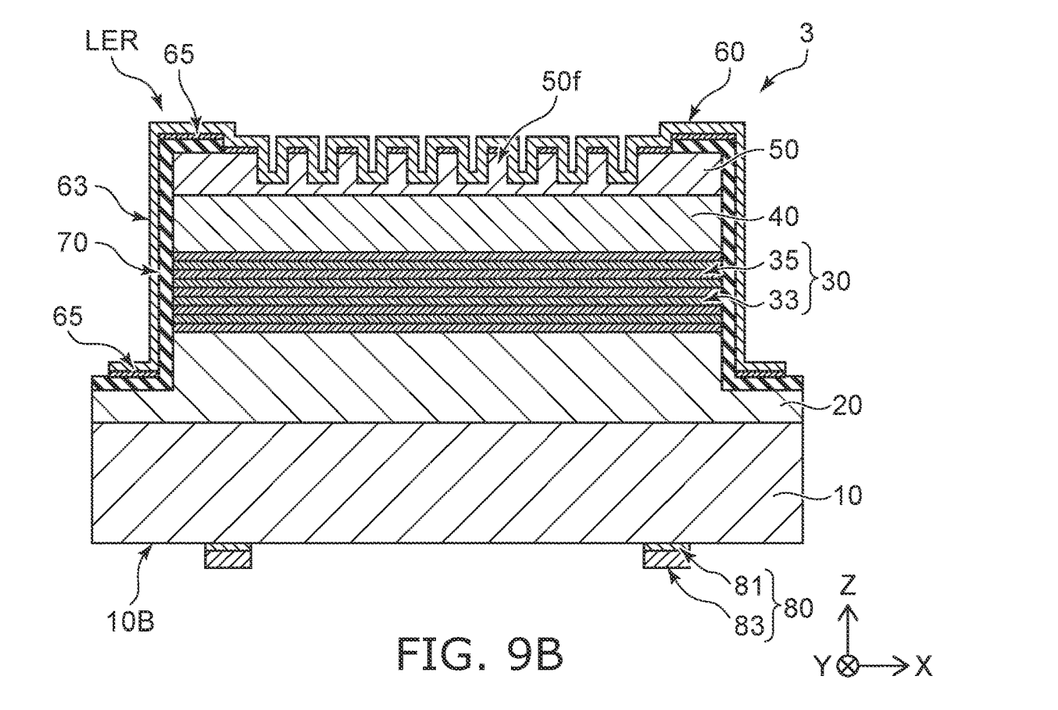

FIGS. 9A and 9B are schematic cross-sectional views showing surface light-emission type semiconductor light-emitting devices 2 and 3 according to modifications of the embodiment.

In the semiconductor light-emitting device 2 shown in FIG. 9A, the light-emitting region LER has the mesa structure; and the front electrode 60 covers the side surface of the light-emitting region LER with the insulating film 70 interposed. Thereby, the light that is radiated toward the outside from the side surface of the light-emitting region LER is returned to the interior of the light-emitting region LER; and the intensity of the QCL light can be increased.

Also, in the semiconductor light-emitting device 3 shown in FIG. 9B, the light-emitting region LER has the mesa structure; and the front electrode 60 covers the side surface of the light-emitting region LER with the insulating film 70 interposed. In the example, the front electrode 60 includes the portion that is provided on the side surface of the light-emitting region LER without the second metal layer 65 interposed; and the first metal layer 63 directly contacts the insulating film 70. The reflectance at the portion of the front electrode 60 that is provided on the side surface of the light-emitting region LER can be improved thereby; and the intensity of the QCL light can be further increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A surface light-emission type semiconductor light-emitting device, the device comprising:
   a first semiconductor layer;
   a light-emitting layer provided on the first semiconductor layer;
   a second semiconductor layer provided on the light-emitting layer;
   an uneven structure provided on the second semiconductor layer, the uneven structure including a protrusion and a recess next to the protrusion;
   a third semiconductor layer provided on the second semiconductor layer, the uneven structure being provided in the third semiconductor layer;
   a first metal layer covering the uneven structure;
   a second metal layer provided between the uneven structure and the first metal layer, the second metal layer being provided on a bottom surface of the recess and not provided on an upper surface of the protrusion;
   a substrate; and
   a first electrode, wherein
   a reflectance of the second metal layer for light radiated from the light-emitting layer is less than a reflectance of the first metal layer for the light,
   at least a part of the substrate is provided on the first electrode,
   the first semiconductor layer is provided on the substrate,
   the first semiconductor layer includes a first part and a second part,
   the first part defines a mesa structure,
   the light-emitting layer is provided on the first part, and is not provided on the second part,
   the first electrode is electrically connected to the substrate, and
   the substrate is configured to cause the light radiated from the light-emitting layer to pass through the substrate.

2. The device according to claim 1, wherein
   the second metal layer has an adhesion strength to the uneven structure, the adhesion strength of the second metal layer being greater than an adhesion strength of the first metal layer to the uneven structure.

3. The device according to claim 1, wherein the first semiconductor layer and the second semiconductor layer are of a same conductivity type.

4. The device according to claim 1, wherein the first metal layer includes gold, and the second metal layer includes titanium.

5. The device according to claim 1, wherein the first metal layer contacts the surfaces other than the one of the bottom surface of the recess, the upper surface of the protrusion, or the side surface of the protrusion.

6. The device according to claim 1, further comprising:
a third metal layer provided between the uneven structure and the first metal layer,
the third metal layer provided on the surfaces other than the one of the bottom surface of the recess, the upper surface of the protrusion, or the side surface of the protrusion,
the third metal layer having a layer thickness thinner than a layer thickness of the second metal layer.

7. The device according to claim 6, wherein
the third metal layer has an adhesion strength to the uneven structure, the adhesion strength of the third metal layer being greater than an adhesion strength of the first metal layer to the uneven structure.

8. The device according to claim 6, wherein the third metal layer includes a metal material same as a metal material of the second metal layer.

9. The device according to claim 1, wherein
the first semiconductor layer and the second semiconductor layer each include indium phosphide, and
the third semiconductor layer includes an indium gallium arsenide mixed crystal.

10. The device according to claim 1, wherein the second semiconductor layer is exposed at the bottom surface of the recess of the uneven structure.

11. The device according to claim 1, wherein the third semiconductor layer is exposed at the bottom surface of the recess and the side surface of the protrusion in the uneven structure.

12. The device according to claim 1, wherein
the uneven structure includes a plurality of the protrusions, and
the plurality of protrusions are arranged at a constant periodicity in a direction along an upper surface of the second semiconductor layer so that a photonic crystal structure is configured by the plurality of protrusions.

13. The device according to claim 12, wherein
the plurality of protrusions is arranged with a period less than a wavelength of the light radiated from the light-emitting layer.

14. The device according to claim 1, wherein
the light-emitting layer includes first and second layers alternately stacked in a direction from the first semiconductor layer toward the second semiconductor layer, the first layer including a first compound semiconductor, the second layer including a second compound semiconductor, the second compound semiconductor being different from the first compound semiconductor;
the light-emitting layer includes a light-emitting multi-quantum well region and an injection multi-quantum well region when operating as a quantum cascade laser, the light-emitting multi-quantum well region including the first and second compound semiconductors, the injection multi-quantum well region including other first and second compound semiconductors; and
the light-emitting layer includes a structure in which a plurality of pairs of the light-emitting multi-quantum well region and the injection multi-quantum well region are stacked.

15. The device according to claim 1, wherein
the first electrode surrounds a region in the surface of the substrate through which the light radiated from the light-emitting layer is emitted externally from the substrate.

16. The device according to claim 1, wherein
a light-emitting body is provided on the substrate, the light-emitting body includes the mesa structure that includes the light-emitting layer and the second semiconductor layer, and
a second electrode including the first metal layer and the second metal layer covers an upper surface and a side surface of the mesa structure.

17. The device according to claim 16, further comprising:
an insulating film covering the side surface of the mesa structure, the insulating film being provided between the second electrode and the side surface of the light-emitting body.

18. The device according to claim 17, wherein
the first metal layer of the second electrode contacts the insulating film on the side surface of the mesa structure.

19. The device according to claim 16, wherein
the second electrode disposed on the side surface of the mesa structure is configured to reflect the light radiated from the light-emitting layer.

* * * * *